United States Patent
Talbot et al.

(10) Patent No.: US 8,078,559 B2
(45) Date of Patent: Dec. 13, 2011

(54) SYSTEM AND METHOD FOR THE AUTOMATED DISCOVERY OF UNKNOWN UNKNOWNS

(75) Inventors: Patrick James Talbot, Colorado Springs, CO (US); Dennis Regan Ellis, Colorado Springs, CO (US); J. Ryan Sanders, Woodland Park, CO (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 415 days.

(21) Appl. No.: 12/132,367

(22) Filed: Jun. 3, 2008

(65) Prior Publication Data

US 2008/0270336 A1    Oct. 30, 2008

Related U.S. Application Data

(63) Continuation of application No. 10/977,588, filed on Oct. 29, 2004, now abandoned, and a continuation-in-part of application No. 10/881,279, filed on Jun. 30, 2004, now Pat. No. 7,917,460.

(51) Int. Cl.
*G06N 5/00* (2006.01)
(52) U.S. Cl. .............................. 706/45; 706/55
(58) Field of Classification Search ............ 706/45, 706/55
See application file for complete search history.

(56) References Cited

U.S. PATENT DOCUMENTS

| | | | |
|---|---|---|---|
| 5,704,017 A | 12/1997 | Heckerman et al. | |
| 6,243,696 B1 | 6/2001 | Keeler et al. | |
| 6,272,478 B1 | 8/2001 | Obata et al. | |
| 6,374,251 B1 | 4/2002 | Fayyad et al. | |
| 6,591,254 B1 | 7/2003 | Keeler et al. | |
| 6,629,095 B1 | 9/2003 | Wagstaff et al. | |
| 6,662,189 B2 | 12/2003 | Oyanagi et al. | |
| 6,728,689 B1 | 4/2004 | Drissi et al. | |
| 2001/0044791 A1 | 11/2001 | Richter et al. | |
| 2002/0052858 A1 | 5/2002 | Goldman et al. | |
| 2002/0103776 A1 | 8/2002 | Bella et al. | |
| 2002/0128816 A1 | 9/2002 | Haug et al. | |
| 2003/0014229 A1 | 1/2003 | Borth et al. | |
| 2003/0018616 A1 | 1/2003 | Wilbanks et al. | |

(Continued)

FOREIGN PATENT DOCUMENTS

EP   0 616 288 A2   9/1994

(Continued)

OTHER PUBLICATIONS

Patrick J. Talbot: "*Semantic Networks: A Unifying Framework for Multistrategy Reasoning*"; Technology Review Journal—Spring/Summer 2003, pp. 59-76.

Dennis R. Ellis: "*Offensive /Defensive Mission Planning: Detailed Plan Optimization Using Genetic Algorithms*"; Technology Review Journal—Fall/Winter 2001, pp. 29-40.

Patrick J. Talbot: "*Automated Discovery of Unknown Unknowns*"; pp. 1-7, Oct. 2006.

(Continued)

*Primary Examiner* — Michael B Holmes
*Assistant Examiner* — Lut Wong
(74) *Attorney, Agent, or Firm* — Tarolli, Sundheim, Covell & Tummino LLP

(57) ABSTRACT

Systems and methods are provided for determining unknown unknowns for at least one assisted decision making system. An assisted decision making system has an associated set of at least one story of interest. The system further comprises a plurality of inferencing algorithms. A given inferencing algorithm is operative to generate story fragments from data stored within an associated knowledge base. A first arbitrator is associated with the first assisted decision making system. The arbitrator accepts a story fragment from the plurality of inferencing algorithms if the story fragment is sufficiently related to a story of interest from the set of at least one story of interest.

19 Claims, 6 Drawing Sheets

U.S. PATENT DOCUMENTS

2003/0041042 A1 2/2003 Cohen et al.
2003/0191727 A1 10/2003 Yao et al.
2004/0019575 A1 1/2004 Talbot et al.

FOREIGN PATENT DOCUMENTS

WO WO 01/97164 A2 12/2001

OTHER PUBLICATIONS

Patrick J. Talbot: "*Military Decision Aids—A Robust Decision-Centered Approach*"; Technology Review Journal—Spring/Summer 2001, pp. 83-96.

Talbot, et al.: "*Computational Antiterrorism Solutions Using a General-Purpose Evidence Fusion Engine*"; Technology Review Journal—Spring/Summer 2002, pp. 23-36.

SYSTEM AND METHOD FOR THE AUTOMATED DISCOVERY OF UNKNOWN UNKNOWNS

RELATED APPLICATIONS

The present application is a continuation-in-part of U.S. patent application Ser. No. 10/881,279, filed on Jun. 30, 2004, now U.S. Pat. No. 7,917,460 entitled: "Systems and Methods for Generating a Decision Network from Text". This application claims priority as a continuation of U.S. patent application Ser. No. 10/977,588, filed Oct. 29, 2004, now abandoned entitled: "System and Method for the Automated Discovery of Unknown Unknowns". Each of these applications is incorporated herein by reference.

TECHNICAL FIELD

The present invention relates to decision making tools and, more particularly, to systems and methods for decision making utilizing automated discovery of unknown unknowns.

BACKGROUND OF THE INVENTION

There are different approaches for organizing information content, such as decision graphs or data tables, namely, a knowledge-based approach and a data-based approach. Using the knowledge-based approach, a person (known as a knowledge engineer) interviews an expert in a given field to obtain knowledge about the given field. The knowledge engineer and expert first determine the distinctions of the subject matter that are important for decision making in the field of the expert. These distinctions correspond to questions about the variables in the domain of interest, referred to as the hypotheses. For example, if a decision graph is to be used to predict the age of a customer based on the products that customer bought in a store, there would be a variable for "age" and a variable for all relevant products. The knowledge engineer and the expert next determine the structure of the decision graph and the corresponding parameter values that quantify the conditional probability distribution.

In the database approach, the knowledge engineer and the expert first determine the variables of the domain. Next, data is accumulated for those variables, and an algorithm is applied that creates one or more decision graphs from this data. The accumulated data comes from real world instances of the domain or hypothesis. That is, real world instances of decision making in a given field. For some decision-making applications, however, it can be difficult in practice to find sufficient applicable data to construct a viable decision network. For example, not all desired data may be readily available for constructing the network. Similarly, not all significant variables in the decision making process may be apparent when the network is constructed.

SUMMARY OF THE INVENTION

In accordance with one aspect of the present invention, a system is provided for determining unknown unknowns for at least one assisted decision making system. An assisted decision making system has an associated set of at least one story of interest. The system further comprises a plurality of inferencing algorithms. A given inferencing algorithm is operative to generate story fragments from data stored within an associated knowledge base. A first arbitrator is associated with the first assisted decision making system. The arbitrator accepts a story fragment from the plurality of inferencing algorithms if the story fragment is sufficiently related to a story of interest from the set of at least one story of interest.

In accordance with another aspect of the present invention, a method is provided for discovering unknown unknowns for an assisted decision making system. A story fragment is generated by an inferencing algorithm. The story fragment is evaluated to determine if it is sufficiently related to a story of interest associated with the assisted decision making system. The story fragment is provided to a user interface if it is sufficiently related to the story of interest.

DETAILED DESCRIPTION OF INVENTION

The present invention relates to systems and methods for assisted decision making utilizing automated discovery of unknown unknowns. In accordance with an aspect of the present invention, unknown unknowns can be determined for one or more stories of interest by a plurality of inferencing algorithms mining an associated knowledge base. In this context, a story is an executable belief network augmented by one or more characteristics of the hypotheses comprising the belief network, the evidence, and the content from which the evidence was extracted. The information mined from the knowledge base is filtered at an arbitrator to ensure that only relevant information is considered for inclusion in the stories of interest. In one implementation, a human analyst provides a final review of information from the plurality of inferencing algorithms, with the arbitrator ensuring that the analyst is not overwhelmed by irrelevant information from the plurality of decision making algorithms.

In certain aspects of the invention, the stories of interest and/or one or more stories comprising the knowledge base can include Dempster-Shafer belief networks. Dempster-Shafer belief network include node parameters that conform to the Dempster-Shafer combination rule, which is based on an evidential interval: the sum of a belief value, a disbelief value, and an unknown value is equal to one. The Dempster-Shafer Combination Rule for fusion of evidence provides for nodes in a network represented as evidential intervals with values from the set of real numbers ($0<=n<=1$). Three parameters specify each node: "belief" (B), "unknown" (U) and "disbelief" (D). The unknown parameter is computed as: U=1−B−D. The Dempster-Shafer Combination Rule is symmetric, bounded, commutative, and associative.

Figure 1:
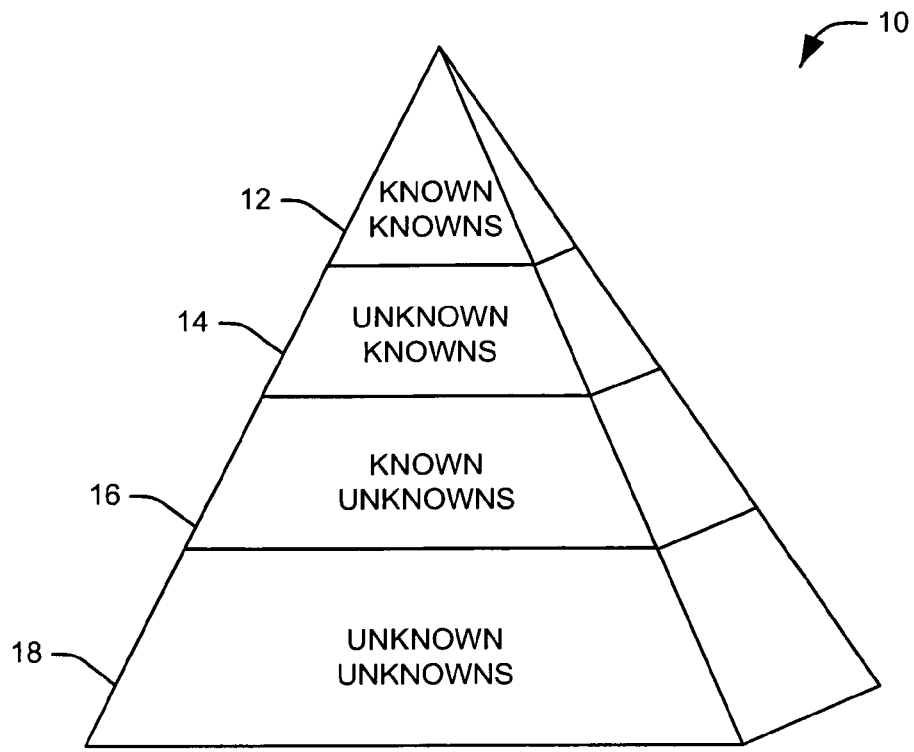
FIG. 1 illustrates an assisted decision making system in accordance with an aspect of the present invention.

FIG. 1 illustrates a number of categories of knowledge considered by decision makers in the form of a knowledge pyramid 10. At the peak 12 of the knowledge pyramid 10 is the knowledge that is both known to the decision maker and effectively incorporated into a story of interest, referred to as "known knowns." Put simply, known knowns are information that an organization is aware of and is utilizing effectively. On the next level 14 of the pyramid are "unknown knowns". An unknown known is an available item of information that has not been incorporated into a story of interest because its relationship to the story has not yet been realized or because the information has not been communicated to the decision maker from associated decision makers. Unknown knowns are information that an organization knows but has not yet effectively utilized.

On a third level 16 of the pyramid is the information that a decision maker understands would be pertinent to a story of interest, but the information is not available. Such an item of information is referred to as a "known unknown." Known unknowns represent the information that an organization is aware that it lacks. Accordingly, the decision making process can be adapted to account for the missing data, for example, by assuming the worst possible instantiation of the missing data. The final level 18 of the pyramid represents information that a decision maker does not realize is missing from a story of interest. This information is referred to as "unknown unknowns," and represents the facts that an organization does not know it doesn't know. It will be appreciated that unknown unknowns can have a significant impact on the effectiveness of a decision maker, as it is impossible to account for their effect on the decision making process with any degree of precision.

Figure 2:
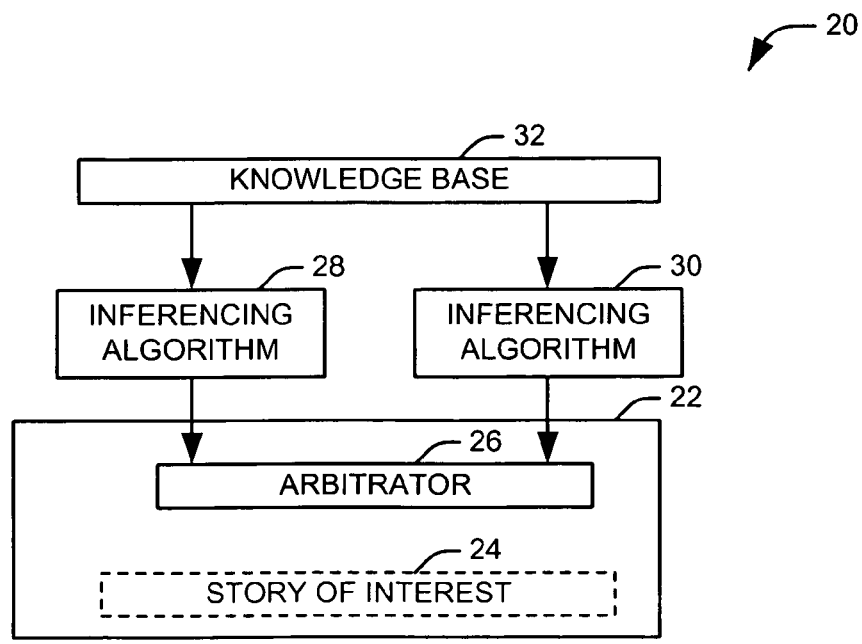
FIG. 2 illustrates a functional block diagram an assisted decision making system utilizing automated discovery of unknown unknowns in accordance with an aspect of the present invention.

FIG. 2 illustrates a functional block diagram of an artificial intelligence system 20 comprising an assisted decision making system 22 utilizing automated discovery of unknown unknowns. The assisted decision making system 22 includes at least one associated story of interest 24. In accordance with an aspect of the invention, a story of interest comprises an executable belief network augmented by one or more characteristics of the hypotheses comprising the belief network, the evidence, and the content from which the evidence was extracted. For example, the characteristics of a given hypothesis can include the answers to the so-called "reporter's questions" for items of evidence supporting the hypothesis (e.g., the source of the evidence, an associated location, an associated time of occurrence, an associated actor, etc.). It will be appreciated that each story of interest will relate to a question of interest to a decision maker utilizing the assisted decision making system 22.

The assisted decision making system 22 further comprises an arbitrator 26 that controls the flow of new data to the assisted decision making system. Specifically, the arbitrator 26 reviews story fragments provided by a plurality of inferencing algorithms 28 and 30 to determine if any of the fragments are sufficiently relevant to the at least one story of interest 22 as to warrant its consideration at the decision making system 22. For example, a given story fragment can be compared to a story of interest to determine to what degree the hypotheses within the story fragment and their associated characteristics resemble those of the hypotheses comprising the story of interest. In an exemplary embodiment, the arbitrator 26 can also evaluate the relatedness of multiple story fragments and combine related fragments prior to applying them to a story of interest. For example, items of evidence and hypotheses provided from a first inferencing algorithm (e.g., 28) that support a hypothesis provided from a second inferencing algorithm (e.g., 30) can be linked with that hypothesis to provide a larger, more complete story fragment.

Each of the plurality of inferencing algorithms 28 and 30 utilize data, including formatted evidence, executable stories, and story fragments from an associated knowledge base 32 to produce story fragments. It will be appreciated that the inferencing algorithms 28 and 30 are not limited to retrieving data from the knowledge base, but can also access data from one or more external sources (e.g., Cyc, WordNET, and similar knowledge bases). In one implementation, the plurality of inferencing algorithms 28 and 30 can include an abductive reasoning algorithm that compiles the best explanation for a body of data in the form of a rule tree. Similarly, the plurality of decision algorithms 24 and 26 can comprise an unsupervised clustering algorithm that attempts to form clusters from the data to determine new hypotheses for the decision making system 22.

Figure 3:
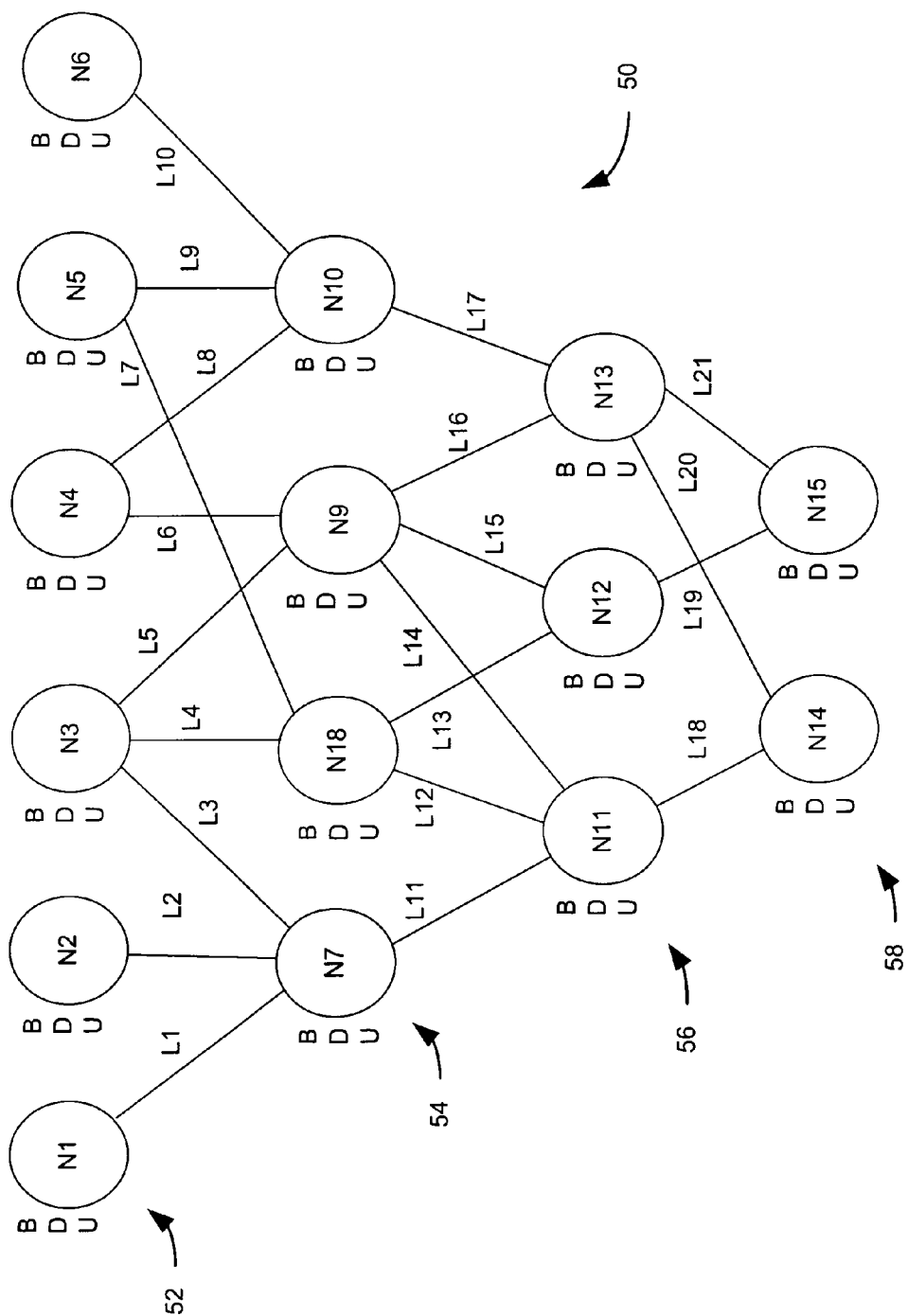
FIG. 3 illustrates a representation of a belief network in accordance with an aspect of the present invention.

FIG. 3 illustrates a representation of a belief network 50 in accordance with an aspect of the present invention. The belief network 50 of FIG. 2 is illustrated as a Dempster-Shafer belief network, but it will be appreciated that other belief networks, such as Bayesian belief networks, can be utilized as stories of interest in accordance with an aspect of the present invention. The decision network 50 includes a top layer 52, a first intermediate layer 54, a second intermediate layer 56, and a bottom layer 58. The top layer 52 includes nodes N1-N6 linked to the first intermediate or hypothesis layer 54 by links or multipliers L1-L10. The first intermediate layer 54 includes nodes N7-N10 linked to the second intermediate layer 54 by links or multipliers L11-L17. The second intermediate layer 56 includes nodes N11-N13 linked to the bottom layer 58 by links or multipliers L18-L21. Each node represents a given variable and hypothesis associated with that variable that can affect the variable and hypothesis of other nodes in lower layers mathematically. Associated with each of the nodes N1-N15 are three parameters, which are a belief parameter B, a disbelief parameter D, and an unknown parameter U. The parameters B, D, and U conform to the Dempster-Shafer evidential interval such that the parameter B, D and U add up to one for each node N1-N15.

The links represent multipliers or weights of a given parameter on a lower node. Link values can be constant, or computed by an algorithm. For example, the belief of node N7 of the first intermediate layer 54 depends on the belief of nodes N1, N2, and N3, each multiplied by its respective link value L1, L2, and L3. Additionally, the disbelief of node N7 of the first intermediate layer 54 depends on the disbelief of nodes N1, N2, and N3, each multiplied by its respective link value L1, L2, and L3. The unknown is computed based on the Dempster-Shafer combination rule. The belief and disbelief of node N7 then propagate to N11 through link L11, which is combined with the belief and disbelief of N18 multiplied by link L12 and the belief and disbelief of node N9 multiplied by link L14. The belief and disbelief of node N11 then propagate to node N14 through link L18 which is combined with the belief and disbelief of N13 multiplied by link L20. The ignorance, or unknowns, of each row can be evaluated using the Dempster-Shafer combination rule. Similar propagation occurs to provide the beliefs, the disbeliefs, and unknowns of the node N15.

Figure 4:
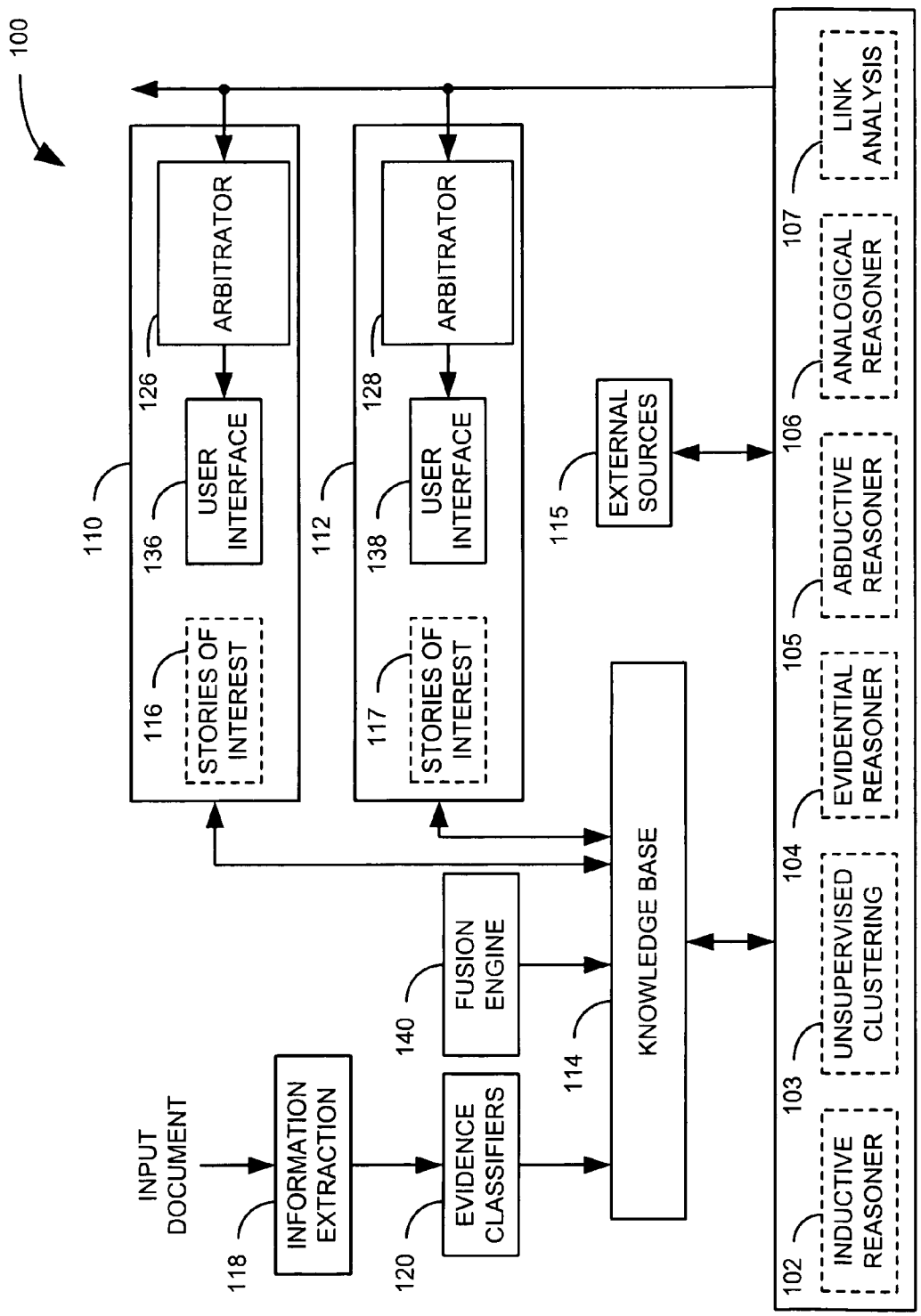
FIG. 4 illustrates an organizational level assisted decision making system utilizing a plurality of inferencing algorithms to discover unknown unknowns for a plurality of affiliated decision making systems in accordance with an aspect of the present invention.

FIG. 4 illustrates an organizational level assisted decision making system 100 utilizing a plurality of inferencing algorithms 102-107 to discover unknown unknowns for a plurality of affiliated decision making systems 110 and 112. It will be appreciated that the plurality of decision making systems 110 and 112 can be remote from one another and from the plurality of inferencing algorithms. The illustrated system 100 can be implemented as one or more computer programs, executable on one or more general purpose computers such as a computer hard drive, random access memory, or a removable disk medium. Accordingly, any structures herein described can be implemented alternately as dedicated hardware circuitry for the described function or as a program code stored as part of a computer-assessable memory (e.g., magnetic storage media, flash media, CD and DVD media, etc.). Functions carried out by the illustrated system, but not helpful in understanding the claimed invention, are omitted from this diagram. For example, a system implemented as a computer program would require some amount of working memory and routines for accessing this memory. Such matters are understood by those skilled in the art.

The plurality of inferencing systems 102-107 utilize data from an associated knowledge base 114 and, optionally, external sources 115. It will be appreciated that the stored data within the knowledge base can include current instantiations of stories of interest 116 and 117 associated with the assisted decision making systems 110 and 112. The external sources can include general knowledge bases such as Cyc or Word-NET. In accordance with an aspect of the present invention, the knowledge base 114 comprises a plurality of stories, where each story comprises an executable belief network comprising at least one hypothesis, evidence supporting the at least one hypothesis, and a reference (e.g., a pointer) to the context from which the evidence was gathered. Each story is executable, such that it can produce mathematically consistent results in response to any change in its associated evidence, belief values, or weights. Accordingly, the stories can be updated and propagated to multiple decision algorithms in real time, allowing for a flexible exchange between a large number of decision algorithms or analysts.

In the illustrated example, evidence and stories can be input into the knowledge base 114 in a number of ways. For example, an information extraction component 118 can be used to reduce an evidence source, such as a text document or a transcripted conversation, into a desired evidence format. This evidence can be linked with existing stories in the knowledge base or new stories can be assembled in response to the evidence. The information extraction component 118 breaks down a input text segment into individual words or phrases, interprets the context and meaning of the various words or phrases, and uses the extracted information to generate a template representing the text segment. For example, the information extraction component 118 can look for details relating to an event described in the document, such as the nature of the event, the cause or motivation for the event, the mechanism of the event, the identity of an actor, the location of the event, the time or date of the event, and the magnitude of the event. Each of these details can be added to a template related to the text segment. In accordance with one aspect of the invention, the information extraction component 118 can look for hedge words (e.g., maybe, probably, certainly, never) within the text segment. The information extraction component 118 can use a co-referencing routine to determine what nouns relate to a given hedge word, and use this information to determine the weight of the evidence associated with the template, in the form of belief values and disbelief values.

To provide a greatly simplified example, the information extraction component 118 might receive a statement from a bank teller that they are certain that Mr. Brown has made a deposit of ten-thousand dollars to a corporate account via a personal check at a bank in downtown Atlanta. The information extraction component 118 would locate the nouns within the sentence as well as words such as "via," "at," and "certain" to determine the relationships between the various nouns and the location of certain information. Thus, the question of location can be answered with the noun or string of nouns following "at" (e.g., bank in downtown Atlanta). The mechanism of the event can be determined by the nouns following "via" (e.g., personal check). The magnitude of the event can be determined by finding the numbers (e.g., ten-thousand), and other details can be provided by classifying the remaining nouns (e.g., Mr. Brown is likely the actor; the event is likely a deposit, etc.). The word "certain," once it is verified that it is referring the deposit, can be used to assign a large belief value to the event. The extracted information becomes associated with the hypotheses supported by the evidence template as hypothesis characteristics, which are used for categorizing and evaluating the associated hypotheses.

During operation, the extracted evidence templates can be provided to one or more evidence classifiers 120. The evidence classifiers 120 can assign the evidence to associated hypotheses according to the evidence content. It will be appreciated that the evidence classifiers 120 can assign the templates to one or more existing hypotheses in the knowledge base 114 or generate a new suggested hypothesis. In an exemplary embodiment, the evidence classifiers 120 can include a rule-based classifier that classifies the templates according to a set of user defined rules. For example, rules can be defined relating to the fields within the template or the source of the data. Other classifiers can include, for example, supervised and unsupervised neural network classifiers, semantic network classifiers, statistical classifiers, and other classifier models. These classifiers can be orchestrated to increase the efficiency of the classification. For example, the rule-based classifier can be applied first, and if a rule is not actuated, a statistical classifier can be used. If a pre-specified probability threshold is not reached at the statistical classifier, a semantic distance classifier can be applied and the results shown to the user for validation.

The plurality of inferencing algorithms 102-107 can include any of a variety of appropriate algorithms for evaluating stored data to determine significant patterns and trends. Specifically, the inferencing algorithms 102-107 search the knowledge base for unanticipated story fragments, comprising at least a single new hypothesis, and more typically of story fragments comprising linked hypotheses and any associated evidence. In the illustrated example, the plurality of inferencing algorithms include an inductive reasoner 102 that computes changes in rules based on new evidence within the knowledge base. The change is based on rule induction, using the old evidence supporting the old structure along with exceptions to the old rules in the existing evidence to induce new rules that better account for the entire body of old and the new evidence. In essence, new rules defining a revised network structure are computed from an aggregate of old and new evidence. In one implementation, the Weka algorithm can be utilized within the inductive reasoner 102.

The plurality of inferencing algorithms can further include an unsupervised clustering algorithm 103. In the unsupervised clustering algorithm 103, evidence templates are grouped according to their associated characteristics. These clusters can provide an indication of previously unknown hypotheses. Further, the unsupervised clustering shows the changes in the density of evidence in support of various existing hypotheses. This may be an indicator of unknown unknowns associated with the changed hypotheses. Another inferencing algorithm can utilize an evidential reasoner 104 that reviews new stories in the knowledge base to determine story fragments and evidence that are related to but not represented in a story of interest. The unaccounted for fragments can represent unknown unknowns.

An abductive reasoner 105 can be used to find the best explanation for new data using positive and negative examples of evidence drawn from past stories that relate to a story of interest. The output of the abductive reasoner 105 is provided in a hierarchically structured way with different degrees of granularity computed that compresses the information represented in a decision network. New hypotheses or linked groups of hypotheses can be extracted from this network as unknown unknowns. One example of an abductive reasoning algorithm is the SUBDUE algorithm developed at the University of Texas at Arlington.

An analogical reasoner 106 can examine the similarity between the present state of a story and past successful decision networks. The analogical reasoner 106 finds successful cases in the knowledge base that are most similar to the present state of a story and suggests differences in hypotheses based on the successful cases. A link analysis component 107 can be used to compute link values between hypotheses based on the characteristics of the hypotheses. When new evidence creates a drastic change in the strength of a link or provides the basis for a new link, the new link data can be provided as an unknown unknown.

The output of the plurality of decision algorithms 102-107 is provided to the plurality of assisted decision making systems 110 and 112 at respective arbitrators 126 and 128. It will be appreciated that while the arbitrators 126 and 128 operate to screen the input to their respective assisted making system, the function of the arbitrators 126 and 128 can be distributed between the assisted decision making systems 110 and 112 and the plurality of decision algorithms 102-107.

The arbitrators 126 and 128 evaluate the story fragments provided by the plurality of decision algorithms 102-107 to determine if a given story fragment is relevant to respective sets of one or more stories of interest 116 and 117. Specifically, an arbitrator (e.g., 126) examines each story fragment and determines if it is sufficiently related to any of its associated stories of interest (e.g., 116) to warrant inclusion of the story fragment in the related story of interest. For example, the arbitrators 126 and 128 can compare the hypotheses, evidence, and links within a story fragment and its associated characteristics with the hypotheses and associated characteristics of a given story of interest. It will be appreciated that the arbitrators 126 and 128 can evaluate the story fragments individually or combine related story fragments from multiple inferencing algorithms to provide a more complete story fragment for evaluation.

Where a threshold level of similarity is found, the story fragment can be provided to human analysts through associated user interfaces 136 and 138. A user interface (e.g., 136) can include a graphical user interface that allows the analyst to quickly review the pertinent portions of the story fragment and determine its relationship to the story of interest. If the human analyst agrees that the story fragment is relevant to the story of interest, he or she can add information to the story fragment and incorporate the story fragment into the story of interest. A fusion engine 140 can mathematically reconcile the story of interest in light of the added story fragments to allow the analyst to see the impact of the story fragment.

Figure 5:
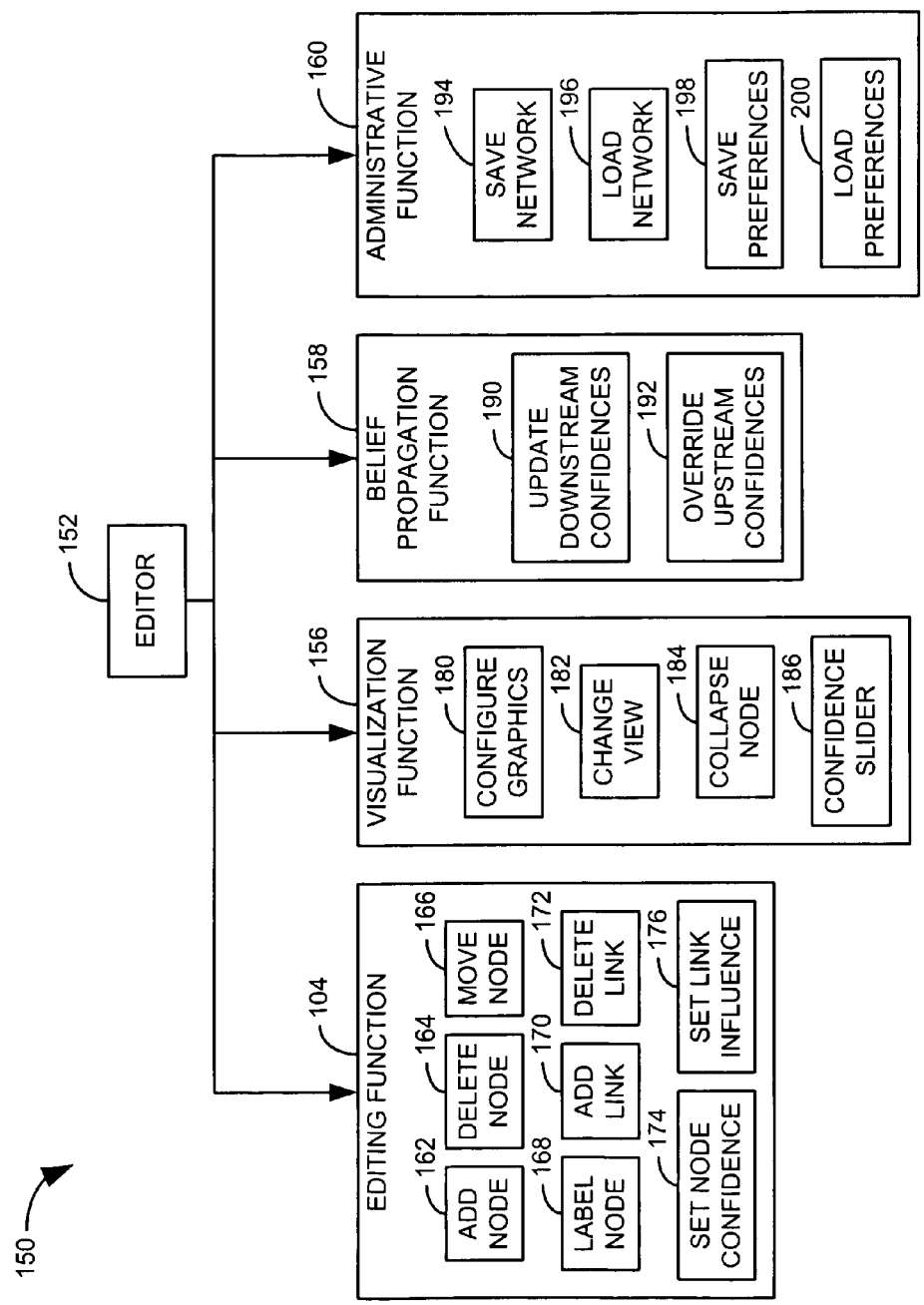
FIG. 5 illustrates a functional block diagram of an exemplary graphic user interface that can be utilized in an assisted decision making system in accordance with an aspect of the present invention.

FIG. 5 illustrates a functional block diagram of an exemplary graphic user interface (GUI) 150 that can be utilized in an assisted decision making system in accordance with the present invention. The GUI 150 includes an editor 152 that allows a user to view and edit a structure argument. The editor 152 has four associated high-level functions, an editing function 154, a visualization function 156, a belief propagation function 158, and an administrative function 160.

The editing function 154 comprises a plurality of sub-functions that allow a user to build and edit a structured argument. For example, several functions allow the user to manipulate the various nodes within the argument model. An add node function 162 allows a user to add a node to an existing argument. A delete node function 164 allows a user to delete an existing node. A move node function 166 allows nodes to be moved while maintaining their current connections. A label node function 168 allows a label, generally identifying the hypothesis associated with the node, to be added to a node within the argument.

Other sub-functions within the editing function 154 allow the user to manipulate the logical connections between nodes. An add link function 170 allows the user to add a connection between two nodes. A delete link function 172 allows the user to delete a connection between two nodes. Additionally, the move node function 166 allows for the rerouting of the various connectors connected to a node as the node is moved. Still other sub-functions within the editing function 154 allow for the modification of parameters within the argument. For example, a set node confidence function 174 allows the user to specify a confidence value for a particular node. Similarly, a set link influence function 176 allows the user to change the influence value of a particular connector.

The visualization function 156 controls the display of the information within the argument model to the user. A graphic configuration sub-function 180 allows the user to specify display preferences for the editor interface 152. For example, the user can specify the colors associated with the nodes and connectors within the argument model. A change view sub-function 182 allows the user to select a zoom level or a portion of the argument model for viewing. A collapse node sub-function 184 allows the user to hide one or more of nodes and connectors downstream of a particular node to simplify the display of the argument model. The sub-function 184 also allows the argument to be reexpanded upon a command from the user. Finally, a confidence slider sub-function 186 allows a user to display a confidence value or an influence value as a line graph scale, ranging from a minimum value to a maximum value. This allows the user to more easily visualize the range of available values when editing these parameters.

The belief propagation function 158 controls the propagation of the effects of modified parameters through a structured argument. For example, an update function 190 updates parameters downstream of a modified parameter to reflect the new value. For example, a changed influence value or confidence value can alter the confidence values of nodes downstream of the change. On occasion, however, it can be desirable to change a downstream node without disturbing the upstream nodes contributing to that node. For example, it may be desirable to determine the sensitivity of the main hypothesis to a hypothesis represented by a particular node. In this case, an override function 192 overrides the effects of the nodes contributing to a node of interest and allows the user to directly modify its associated confidence value.

The administrative function 160 allows a user to manage data generated with the editor 152. For example, a save network function 194 allows a user to save a generated network as a file. A load network function 196 allows a user to load an existing file representing an argument model into the editor 152. A save preferences function 198 allows the user to save one or more display preferences as configuration data. For example, a preferred color scheme for the editor display can be saved with this function. Conversely, a load preferences function 200 allows the user to load saved configuration data into the editor 152. It will be appreciated that the listed functions associated with the editor 152 are solely exemplary and should be considered neither exhaustive nor necessary for the practice of the present invention.

Figure 6:
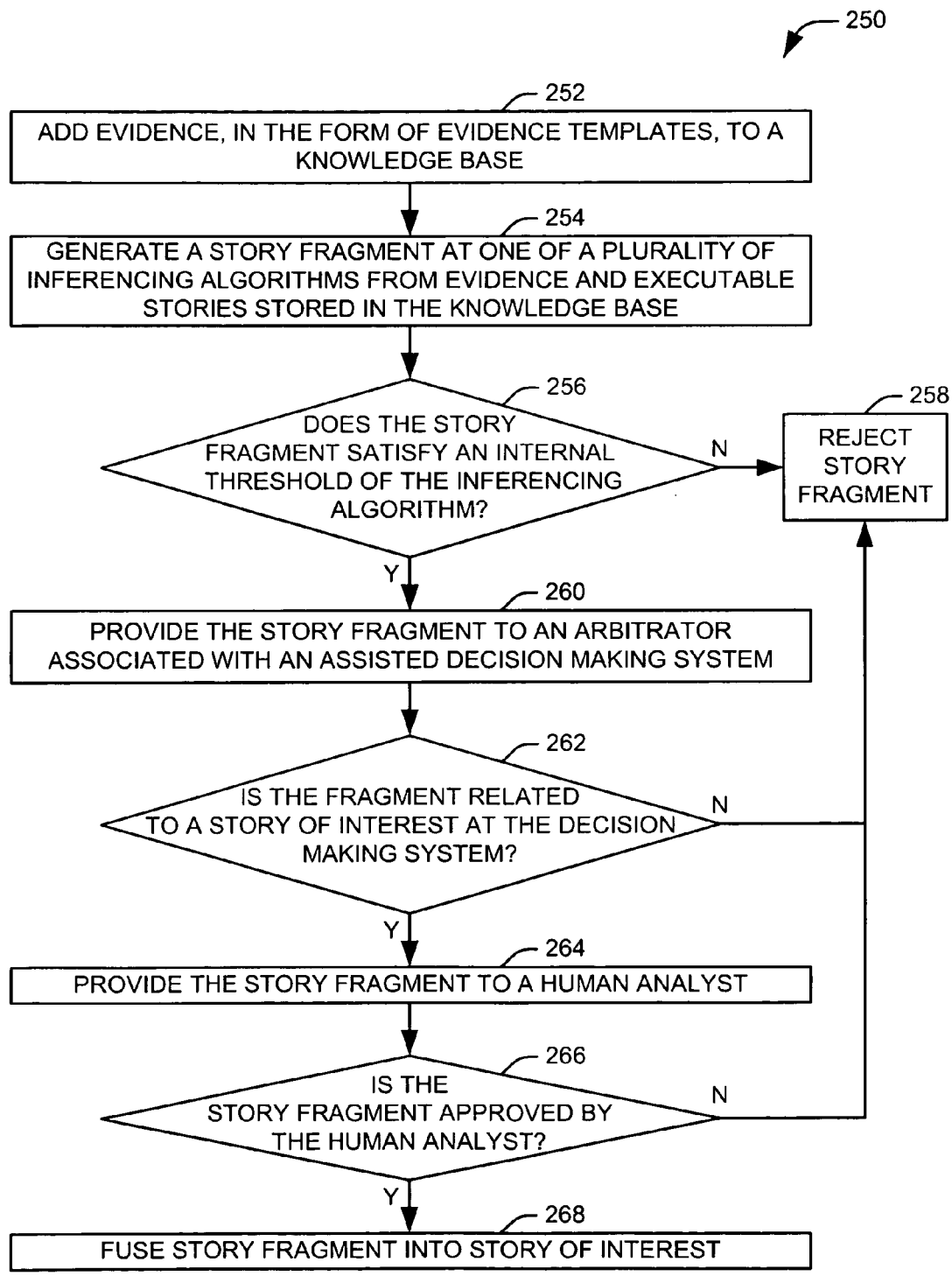
FIG. 6 illustrates a methodology for constructing a decision network from a plurality of text documents in accordance with an aspect of the present invention.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 6 illustrates a methodology 250 for discovering unknown unknowns for an assisted decision making system in accordance with the present invention. At 252, evidence is added to the knowledge base in the form of evidence templates. At 254, a story fragment is generated at one of a plurality of inferencing algorithms. For example, the inferencing algorithms can examine data from an associated knowledge base to determine previously unknown story fragments related to one or more stories of interest. It is then determined at 256 if the story fragment satisfies an internal threshold associated with the inferencing algorithm. For example, in an unsupervised clustering algorithm, it can be determined if a given cluster is sufficiently dense to indicate a valid relationship among a set of clustered evidence. If the story fragment does not meet the internal threshold of its associated inferencing algorithm (N), it is rejected at 258.

If the story fragment meets the internal threshold of its associated inferencing algorithm (Y), the story fragment is provided to an arbitrator associated with a decision making system at 260. At 262, it is determined if the story fragment is sufficiently related to one or more stories of interest associated with the arbitrator. For example, the hypotheses, links, and evidence in a story fragment and its associated characteristics can be compared with the hypotheses and associated characteristics of a given story of interest to determine the relatedness of the story fragment and the story. If the story fragment is not sufficiently related to the story of interest (N), the story fragment is rejected at 258.

If the story fragment is determined to be sufficiently related to the story of interest (Y), the story fragment is provided to a human analyst at 264. The human analyst will generally be an expert in a field represented by the stories of interest in his or her associated decision making system. The analyst determines at 266 if the story fragment will be useful in the story of interest. If it is determined not to be useful (N), the story fragment is rejected at 258. If the story fragment is determined to be useful (Y), the story fragment is fused into the story of interest at 268. For example, a fusion engine associated with the assisted decision making system can compute the union of the story and the story fragment and mathematically reconcile the combined story.

Figure 7:
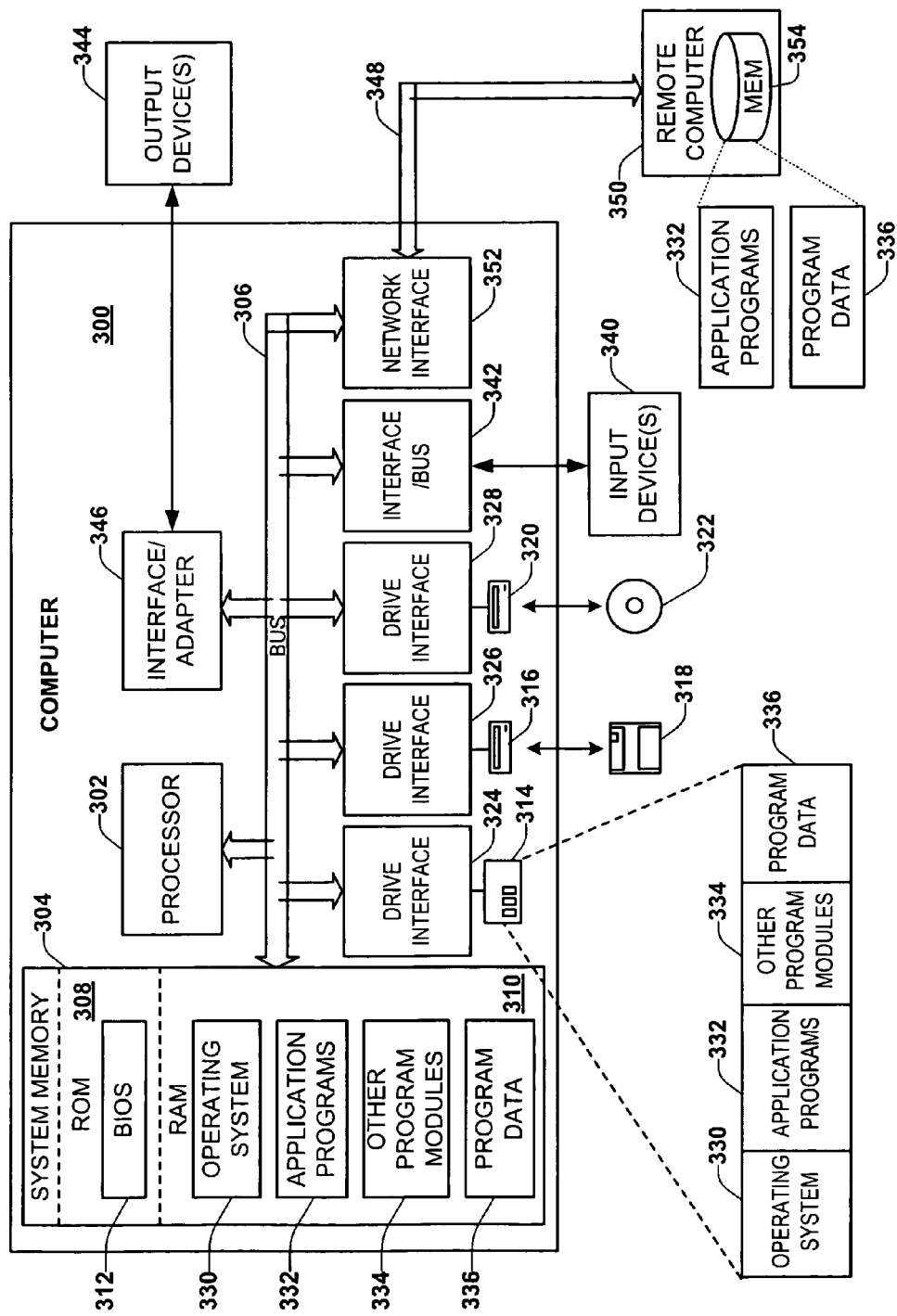
FIG. 7 illustrates a schematic block diagram of an exemplary operating environment for a system configured in accordance with an aspect of the present invention.

FIG. 7 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. A system bus 306 couples various system components, including the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, e.g., to read from or write to a removable disk 318, and an optical disk drive 320, e.g., for reading a CD-ROM or DVD disk 322 or to read from or write to other optical media. The hard disk drive 314, magnetic disk drive 316, and optical disk drive 320 are connected to the system bus 306 by a hard disk drive interface 324, a magnetic disk drive interface 326, and an optical drive interface 334, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 310, including an operating system 330, one or more application programs 332, other program modules 334, and program data 336.

A user may enter commands and information into the computer system 300 through user input device 340, such as a keyboard, a pointing device (e.g., a mouse). Other input devices may include a microphone, a joystick, a game pad, a scanner, a touch screen, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. For example, while a number of examples herein have discussed the construction of Dempster-Shafer belief networks, it will be appreciated that other decision networks, such as Bayesian belief networks and Markov networks, can be constructed from text in accordance with the present invention. Accordingly, the present invention is intended to embrace all such alterations, modifications, and variations that fall within the spirit and scope of the appended claims.

What is claimed is:

1. A machine for determining potential unknown unknowns for an assisted decision making system, where an unknown unknown is an item of data that is missing from a story of interest and whose absence is not accounted for in the story of interest, comprising:
   a processor;
   a memory containing:
      an information extraction algorithm that extracts evidence from unformatted text segments to produce an evidence template and an associated confidence value from a given text segment;
      a plurality of inferencing algorithms, a given inferencing algorithm receiving evidence templates from the information extraction component and generating a story fragment comprising at least one hypothesis, evidence supporting the at least one hypothesis, and respective belief values associated with the at least one hypothesis from the evidence stored in the knowledge base; and
      an arbitrator, associated with the assisted decision making system, that compares the at least one hypothesis and the evidence supporting the at least one hypothesis comprising the story fragment to a plurality of hypotheses and associated evidence comprising a story of interest associated with the assisted decision making system to determine if the story fragment is sufficiently related to the story of interest as to represent a potential unknown unknown within the story of interest.

2. The machine of claim 1, further comprising a second arbitrator that compares the at least one hypothesis and the evidence supporting the at least one hypothesis to a plurality of hypotheses and associated evidence comprising a second story of interest associated with the assisted decision making system to determine if the story fragment is sufficiently related to the story of interest as to represent a potential unknown unknown within the second story of interest.

3. The machine of claim 1, the arbitrator fusing a first story fragment from a first decision algorithm that has been determined to represent a potential unknown unknown and a second story fragment from a second decision algorithm that has been determined to represent a potential unknown unknown to produce a combined story fragment.

4. The machine of claim 1, the assisted decision making system having an associated user interface, the arbitrator providing a story fragment to a human analyst through the user interface if it is determined that the story fragment is a potential unknown unknown for the story of interest.

5. The machine of claim 1, each inferencing algorithm further generating a metric that represents a validity of the generated story fragment, the story fragment being provided to the arbitrator only if the generated metric exceeds an internal threshold associated with the inferencing algorithm.

6. The machine of claim 1, further comprising a knowledge base comprising a plurality of executable stories, where an executable story is an executable belief network comprising a plurality of hypotheses, evidence supporting the plurality of hypotheses, and a plurality of text documents from which the evidence supporting the plurality of hypotheses was extracted.

7. The machine of claim 6, the plurality of inferencing algorithms comprising an inductive reasoner that determines appropriate structural changes in the story of interest, including the addition and removal of the plurality of hypotheses comprising the story of interest as well as links connecting pairs of hypotheses within the plurality of hypotheses, in response to new evidence from the information extraction algorithm.

8. The machine of claim 1, the plurality of inferencing algorithms comprising an evidential reasoner that reviews executable stories in the knowledge base to identify story fragments and evidence that may be relevant to the story of interest.

9. The machine of claim 1, wherein the processing data stored in the knowledge base comprises using an abductive reasoning process on new evidence provided to the knowledge base in an hierarchy and determining a plurality of new hypotheses and logical relationships between the new hypotheses from the hierarchy.

10. The machine of claim 1, the information extractor producing an evidence template comprising a plurality of text fields describing an event of interest, including text fields describing at least two of a nature of the event, a cause of the event, a mechanism producing the event, an actor associated with the event, a location of the event, a time of the event, and a magnitude of the event.

11. The machine of claim 10, further comprising at least one evidence classifier that classifies a given evidence template according to the associated plurality of text fields to associate the evidence template with a hypothesis.

12. The machine of claim 1, the unformatted text segments being received from a source external to the machine.

13. A computer implemented method for discovering potential unknown unknowns for an assisted decision making system, where an unknown unknown is an item of data that is missing from a story of interest and whose absence is not accounted for in the story of interest, comprising:
   processing unstructured data received at an inferencing algorithm to generate a story fragment comprising at least one hypothesis, evidence supporting the at least one hypothesis, and respective belief values associated with the at least one hypothesis, as well as a metric that represents a validity of the generated story fragment;
   comparing the generated metric to an internal threshold of the inferencing algorithm;
   comparing the at least one hypothesis and the evidence supporting the at least one hypothesis comprising the story fragment to a plurality of hypotheses and associated evidence comprising a story of interest associated with the assisted decision making system to determine if the story fragment is sufficiently related to the story of interest if the generated metric exceeds the internal threshold of the inferencing algorithm; and providing the story fragment to a user interface for review by a user as a potential unknown unknown associated with the story of interest if it is sufficiently related to the story of interest.

14. The method of claim 13, further comprising fusing the story fragment and the story of interest according to input from the user provided through the user interface.

15. The method of claim 13, wherein processing unstructured data comprises:
   extracting evidence from unformatted text segments to produce an evidence template;
   clustering evidence templates as part of an unsupervised clustering algorithm according to characteristics of the evidence, the generated metric comprising an associated density of a cluster of evidence supporting at least one hypothesis in the generated story fragment.

16. The method of claim 15, wherein processing unstructured data further comprises computing a link value between two hypotheses, each hypothesis having an associated set of a plurality of evidence templates, with a given evidence template comprising a plurality of text fields describing an event of interest, the link value being computed according to a comparison of the sets of evidence templates associated with the two hypotheses.

17. A non transitory computer readable medium, operative in a computer processor to discover potential unknown unknowns for an assisted decision making system, where an unknown unknown is an item of data that is missing from a story of interest and whose absence is not accounted for in the story of interest, comprising:
   an information extraction component that extracts evidence from unformatted text segments to produce an evidence template and an associated confidence value from a given text segment; and
   at least one inference component that generates a story fragment comprising at least one hypothesis, evidence supporting the at least one hypothesis, and respective belief values associated with the at least one hypothesis from the evidence templates from the information extraction component, as well as a metric that represents a validity of the generated story fragment; and
   a plurality of arbitrators, representing respective stories of interest associated with the assisted decision making system, that compare the at least one hypothesis and the evidence supporting the at least one hypothesis comprising the story fragment to a plurality of hypotheses and associated evidence comprising each of the plurality of stories of interest associated with the assisted decision making system to determine if the story fragment is sufficiently related to any one of the plurality of stories of interest as to represent a potential unknown unknown within the story of interest.

18. The computer readable medium of claim 17, further comprising a knowledge base comprising a plurality of executable stories, where an executable story is an executable belief network comprising a plurality of hypotheses, evidence supporting the plurality of hypotheses, and a plurality of text documents from which the evidence supporting the plurality of hypotheses was extracted.

19. The computer readable medium of claim 17, the assisted decision making system having an associated user interface, a given arbitrator of the plurality of arbitrators providing a story fragment to a human analyst through the user interface only if it is determined that the story fragment is a potential unknown unknown for the story of interest associated with the arbitrator.

* * * * *